Oct. 25, 1960  A. SCHNEIDER ET AL  2,957,513
METHOD AND APPARATUS FOR HEAT SEALING AND
SEVERING BY MEANS OF A STENCIL
AND HOT GAS STREAM
Filed Dec. 19, 1958  2 Sheets-Sheet 1
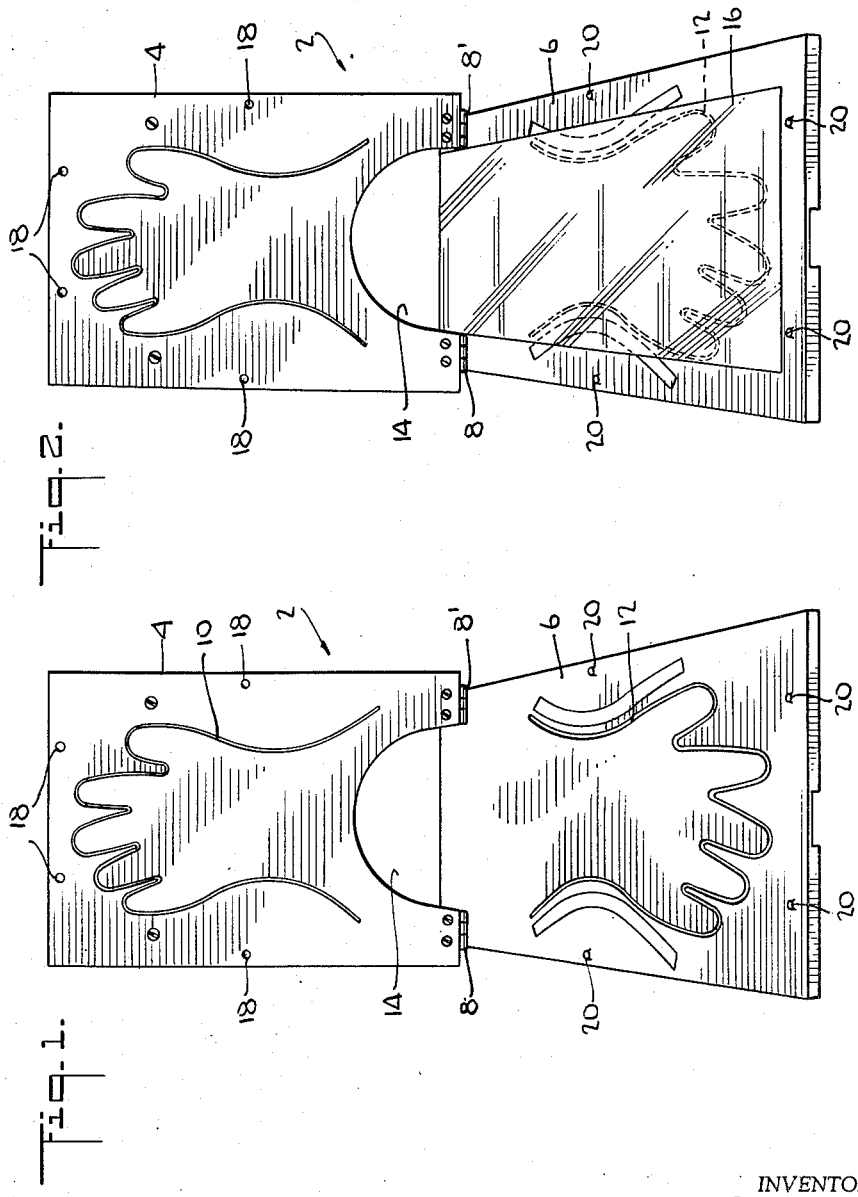
INVENTORS
ADOLF SCHNEIDER
ROLF DRAEGER
BY HANS-OTTO FURCHNER
WILLY BAENKLER
AGENT

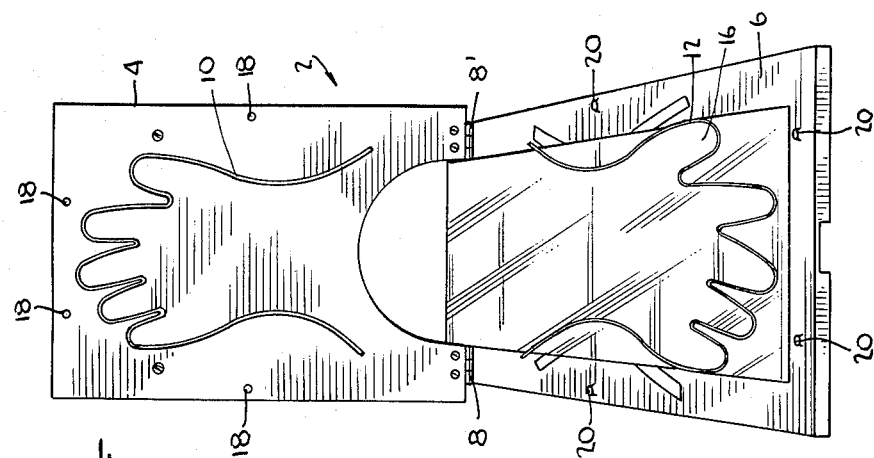
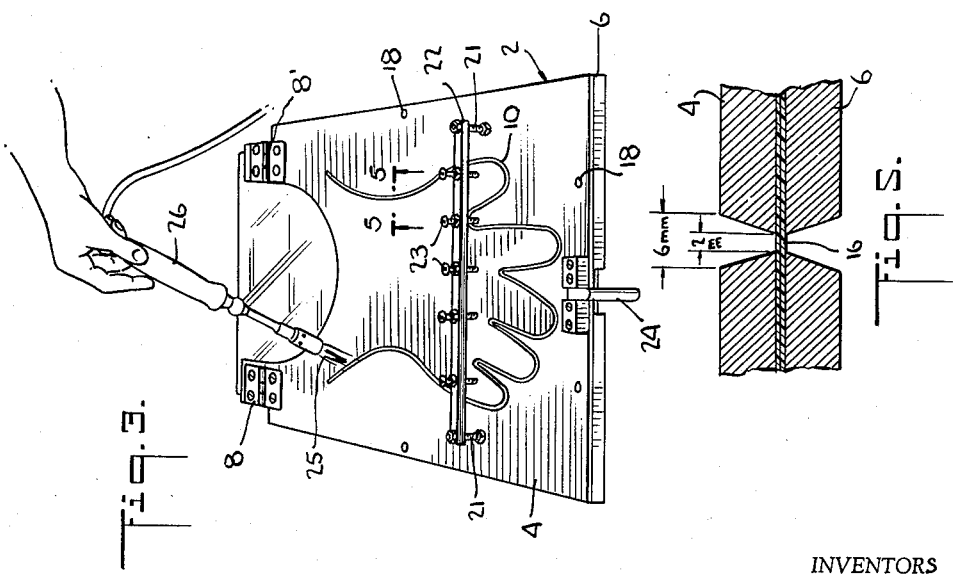

United States Patent Office 2,957,513
Patented Oct. 25, 1960

2,957,513

METHOD AND APPARATUS FOR HEAT SEALING AND SEVERING BY MEANS OF A STENCIL AND HOT GAS STREAM

Adolf Schneider, Rolf Draeger, Hans-Otto Furchner, and Willy Baenkler, all of Konstanz, Germany, assignors to Byk-Gulden Lomberg, Chemische Fabrik G.m.b.H., Konstanz, Germany, a corporation of Germany Filed Dec. 19, 1958, Ser. No. 781,519

Claims priority, application Germany Dec. 20, 1957

4 Claims. (Cl. 154—42)

This invention relates to a process for simultaneously welding heat sealable thermoplastic resin material and forming a seam. More particularly this invention relates to a process for forming articles from heat sealable thermoplastic resin films wherein the operation simultaneously forms the article, heat seals the thermoplastic resin films, and at the same time forms a thin seam of exceptional strength. It has particular application to polyethylene and polystyrene films.

A variety of processes are described in the prior art for welding thermoplastic resin films by means of heat applied in various forms, for instance, hot air, high frequency heating. These processes result in a relatively broad seam which is not sufficiently strong and tight for many purposes. Furthermore, the films must be cut before or after welding.

It has also been suggested in the prior art to cut and seam layers of a thermoplastic material by means of the so-called hot wire technique. For many purposes this technique has been found to be unsuitable because of the relatively heavy beaded seam that may form. Moreover, the latter requires rather expensive equipment.

It has now been found unexpectedly that heat sealable thermoplastic resins, for instance, polyethylene and polystyrene may be edge welded in a simple and inexpensive manner whereby a thin seam of great strength is obtained.

It is an object of the present invention to produce a simple, effective and inexpensive process for welding layers of heat sealable thermoplastic resins, for instance, polyethylene and polystyrene together forming a thin seam of great strength.

It is a further object of the present invention to provide a simple, effective, and inexpensive method of welding layers of heat sealable thermoplastic resins, such as polyethylene and polystyrene, forming a thin seam, which process employs a stencil and a heat source such as a flame.

It is a further object of the present invention to form an article of manufacture from superimposed layers of heat sealable thermoplastic resin films, for instance, of polyethylene and polystyrene, preferably in the form of a tube, by means of a stencil and flame, whereby the resin films are simultaneously cut into form, welded, and seamed, the seam produced being thin and very strong.

Other and more detailed objects of the present invention will become apparent from the following description, claims, and the annexed drawings. In said drawings:

Fig. 1 is a perspective view of a hinged double stencil which is used in the present invention, said hinges being shown in open position.

Fig. 2 is a perspective view of the device shown in Fig. 1 with a tube of polyethylene film in position on the device.

Fig. 3 is a perspective view of the assembly shown in Fig. 2 in closed position, the manner of using the flame being illustrated.

Fig. 4 is a perspective view of the device shown in Fig. 3 in open position after completing the welding and seam forming operation.

Fig. 5 is an enlarged view of a partial section of the device taken along line 5—5 of Fig. 3 showing the taper of the slits of the stencil plates.

In accordance with the present invention as illustrated in Fig. 1 of the drawings a hinged form or stencil 2 is provided having an upper plate 4, and a lower plate 6 secured together by hinges 8 and 8'. Plates 4 and 6 may be made of any suitable material which will withstand the heat applied. However, in the preferred form of this invention the plates are made of steel.

A stencil 10 is cut clear through upper plate 4 and a corresponding stencil 12 is similarly cut clear through lower plate 6, the respective stencils being congruent and disposed to fit exactly one above the other when the upper and lower plates 4 and 6 are brought together. The width of the stencil slits are preferably from about 2 mm. to about 10 mm.

Upper plate 4 is also provided with a semicircular opening 14 through which the plastic film tube 16 may pass when the plates are brought together. Holes 18 are cut through upper plate 4 which receive lugs 20 of lower plate 6 which together serve to center the plates in closed position.

Secured to the outer surface of upper plate 4 by means of bolts 21, is frame 22 provided with a series of screws 23. The assembly of bolts 21, frame 22 and screws 23 serve to maintain the counter sunk stencil 10 in position which on repeated heating would have a tendency to rise outwardly and to become deformed.

Lock 24 fastened to the outer surface of upper plate 4 serves to secure the upper and lower plates together during the heating operation.

The dimensions of the upper and lower stencil plates are the same. They can, however, be varied considerably in actual size. A typical plate, useful, for instance, for making plastic gloves, is 35 cm. wide, 55 cm. long, and from 6 to 8 mm. thick. The semicircular opening 14 may also be varied. In the device of the above mentioned dimensions it has a radius of 14 cm. The hinges 8 and 8' are 3.5 cm. long.

The shape of the slits of the stencils used in this invention are important and are illustrated in Fig. 5 of the drawings. As will be noted each of the slits is tapered inwardly toward the center of the slit and the location of the two plastic films 16 maintained between plates 4 and 6. The distance between the inner edges of the slits is preferably 2 mm. whereas the distance between the outer edges of the slits are preferably 6 mm. This construction is important in obtaining a uniform distribution of the welding flame of the burner in the slits. Perpendicular walls in the stencil slits cause the development of air currents which impinge on the flame and cause irregular heating.

In accordance with the process of the present invention two sheets of the plastic material, preferably in tubular form, are placed between the upper and lower plates 4 and 6 as illustrated in Fig. 2 of the drawings. The upper plate 4 is moved downwardly rotating about hinges 8 and 8' and is secured to plate 6. Fig. 3 of the drawings illustrates this stage of the process. The film which is visible through the openings of the stencil is then heated preferably with a gas flame 25 from torch 26. It is generally heated to a temperature of about 100° C. above the melting point of the plastic material employed. In the preferred form of this invention with polyethylene or polystyrene foils, a maximum welding temperature of about 200° C. is employed. It is also possible to substantially increase the temperature above this value whereby the speed of the welding process increases. However, the quality of the seam is somewhat impaired thereby. If desired, the heating may be effected with hot air, a gas flame, and the like.

The welding time, that is the time during which heat is applied along the sheets of the stencil, will vary with the heat source and, in the case of flame welding, with the gas pressure. In general the time of welding will be in the range of about 30 seconds to 60 seconds with an average of about 45 seconds.

As soon as the plastic material visible through the slits melts, the heat source is removed and the stencils are separated. The finished produt is provided with a dense edge seam without the necessity of forming it in a separate step before or after the welding process.

Although in the embodiment of this invention illustrated in the drawings, the manufacture of a plastic glove is shown, this process may be used to manufacture a wide variety of articles which may be manufactured from superimposed layers of thermoplastic heat sealable resin films. Thus, it may be used to manufacture containers, for instance, bags, sacks, etc. or protective articles of clothing, for instance, hoods, outer stockings for protection against acids and bases, and other articles.

The following example is further illustrative of the present invention. It is to be understood, however, that this invention is not restricted thereto.

*Example*

Two steel plates having a combined thickness of 16 mm. are screwed to each other and the outline of a glove is drawn on the upper plate. Using a 6 mm. milling cutter, the outline is counter sunk through each of the plates. The stencils cut in this fashion are illustrated in Fig. 1. The contour of the slits is shown in Fig. 5. After removal of the screws the plates are secured to each other by means of a hinge. Polyethylene tubing which lays flat and has a width of 25 cm. and a film thickness of 0.05 mm. is placed between the two formed stencils and the forms are brought together and secured. The polyethylene film is visible through the counter sunk slits. The grooves are heated with a gas burner until the film is definitely and visibly melted, and the melted polyethylene is deposited on both sides of the groove in the form of a dense small seam. The form is then unfastened and the finished glove is taken out. Such a glove is suitable for sanitary, medical, and chemical purposes, since the hand and the sleeve are protected from dirt, infection, or burning due to chemical agents.

Of course, many changes and variations in the thermoplastic material and the material of the stencil plates, the heat source, the mode of fastening and clamping together the stencil plates and of cutting out the stencil, and the like may be made by those skilled in the art in accordance with the principles set forth herein and in the claims annexed thereto.

We claim:

1. A process of manufacturing a glove from two superposed layers of a thermoplastic, heat-sealable plastic film material, comprising the step of subjecting the superposed layers of the film material for a short period of time to a narrow and confined stream of hot gas, the hot gas stream being confined to the contour of the glove and tapering conically toward said layers, and the temperature of the gas stream being substantially above the melting point of the plastic whereby the film material layers are simultaneously cut and welded along the path of the gas stream and a narrow and strong seam is formed along the contour of the glove.

2. The glove manufacturing process of claim 1, wherein the temperature of the gas stream does not exceed the melting point of the plastic by more than 100° C.

3. The glove manufacturing process of claim 1, wherein the superposed plastic film material layers are subjected to the confined stream of hot gas for a period of time in the range of about 30 seconds to 60 seconds.

4. An assembly useful for the manufacture of gloves from two superposed layers of a thermoplastic, heat-sealable plastic film material connected by a narrow but strong seam, comprising two superposed plates defining congruent stencils having the contour of a glove, each stencil being inwardly tapered from a width not exceeding about 10 mm. to a width not below about 2 mm., the plates being arranged to receive the two superposed plastic film material layers therebetween, and a source of a hot gas stream for application to said stencils whereby said film material layers are simultaneously cut and welded along said contour to form said seam when the hot gas stream is applied.

References Cited in the file of this patent

UNITED STATES PATENTS

| | | |
|---|---|---|
| 1,834,078 | Stein | Dec. 1, 1931 |
| 2,232,640 | Schwartzman | Feb. 18, 1941 |
| 2,423,237 | Haslacher | July 1, 1947 |
| 2,481,602 | Lindh | Sept. 13, 1949 |
| 2,678,679 | Bergstein | May 18, 1954 |
| 2,726,706 | Hakomaki | Dec. 13, 1955 |
| 2,762,421 | Quinche | Sept. 11, 1956 |
| 2,786,511 | Reid | Mar. 26, 1957 |